United States Patent
Yasui et al.

(10) Patent No.: US 8,563,138 B2
(45) Date of Patent: Oct. 22, 2013

(54) ADHESIVE AND LAMINATE MADE WITH THE SAME

(75) Inventors: Shigeyuki Yasui, Rye Brook, NY (US); Seiji Ota, Chiba (JP); Takashi Sakuma, Narashino (JP)

(73) Assignee: Mitsui Chemicals Inc., Tokyo (JP)

( * ) Notice: Subject to any disclaimer, the term of this patent is extended or adjusted under 35 U.S.C. 154(b) by 549 days.

(21) Appl. No.: 12/223,174

(22) PCT Filed: Jan. 24, 2007

(86) PCT No.: PCT/JP2007/051086
§ 371 (c)(1),
(2), (4) Date: Jul. 24, 2008

(87) PCT Pub. No.: WO2007/086425
PCT Pub. Date: Aug. 2, 2007

(65) Prior Publication Data
US 2010/0173168 A1    Jul. 8, 2010

(30) Foreign Application Priority Data
Jan. 26, 2006    (JP) .................................. 2006-017449

(51) Int. Cl.
*B32B 27/00*    (2006.01)
*B32B 27/08*    (2006.01)

(52) U.S. Cl.
USPC ............................ 428/516; 428/500; 428/515

(58) Field of Classification Search
USPC ........................................................ 428/516
See application file for complete search history.

(56) References Cited

U.S. PATENT DOCUMENTS

| | | | |
|---|---|---|---|
| 5,695,838 A | 12/1997 | Tanaka et al. | |
| 6,391,974 B1 * | 5/2002 | Ogawa et al. | 525/191 |
| 7,645,829 B2 * | 1/2010 | Tse et al. | 524/515 |
| 7,700,707 B2 * | 4/2010 | Abhari et al. | 526/348 |
| 2003/0153686 A1 | 8/2003 | Onoe et al. | |
| 2004/0176541 A1 | 9/2004 | Jackson et al. | |
| 2009/0068483 A1 | 3/2009 | Morikawa et al. | |

FOREIGN PATENT DOCUMENTS

| | | |
|---|---|---|
| EP | 0 360 646 A2 | 3/1990 |
| EP | 0 636 653 A1 | 2/1995 |
| EP | 1 541 602 A1 | 6/2005 |
| JP | 04-300933 A | 10/1992 |
| JP | 09-111069 A | 4/1997 |
| JP | 11-350283 | 12/1999 |
| JP | 2000-143899 | 5/2000 |
| JP | 2000-198171 | 7/2000 |
| JP | 2001-288436 | 10/2001 |
| JP | 2004-067729 | 3/2004 |
| WO | WO 2006/118272 A1 | 11/2006 |
| WO | WO 2006118272 | * 11/2006 |

OTHER PUBLICATIONS

Machine Translation of JP 2000-143899, May 2000.*
Machine Translation of JP 2000-198171, Jul. 2000.*
European Search Report dated Nov. 25, 2009 received in corresponding European Application No. 07707333.6.

* cited by examiner

*Primary Examiner* — Sheeba Ahmed
(74) *Attorney, Agent, or Firm* — Foley & Lardner LLP

(57) ABSTRACT

Provided is a polypropylene-based adhesive having an MFR of 2.7 g/10 min or higher, as measured at 230° C. under a load of 2.16 kg, comprising a composition which contains 5-95 parts by weight of (A) an isotactic polypropylene, 95-5 parts by weight of (B) a propylene/ethylene random copolymer, and 0-40 parts by weight of (C) an ethylene/propylene random copolymer, wherein 100 parts by weight of the composition is graft modified with 0.001-5 parts by weight of an unsaturated carboxylic acid and/or a derivative thereof, and wherein (B) is characterized by the following (i) to (iii): (i) the propylene/ethylene random copolymer (B) contains 60-90 mol % units derived from propylene and 10-40 mol % units derived from ethylene; (ii) the melting point (Tm) is in the range of 40-120° C.; and (iii) the molecular weight distribution (Mw/Mn) is in the range of 1.0-3.0.

6 Claims, No Drawings

ADHESIVE AND LAMINATE MADE WITH THE SAME

TECHNICAL FIELD

The present invention relates to a novel adhesive and a laminate made with the same. More specifically, the present invention relates to a polypropylene-based adhesive which is excellent in both initial adhesion and adhesion after a heat history, and to a laminate made with the same.

BACKGROUND ART

Polypropylene has been widely used as a thermoplastic molding material with superior rigidity, heat resistance, transparency, and the like. However, this polypropylene lacks flexibility, and when used as an adhesive, a soft rubber component is usually blended to the polypropylene. Even though a polypropylene-based adhesive with an improved adhesion property is thus obtained by blending a soft rubber component to the polypropylene (see, for example, Patent Documents 1 and 2), there has been, on the other hand, a problem that adhesive strength of the adhesive deteriorates when subjected to a heat history at a temperature of 40° C. or higher. Thus, advent of a polypropylene-based adhesive excellent in both initial adhesion and adhesion after a heat history has been desired.

Patent Document 1: Japanese Patent Laid-Open Publication No. H9-111069

Patent Document 2: Japanese Patent Laid-Open Publication No. H4-300933

DISCLOSURE OF THE INVENTION

Problems to be Solved by the Invention

An object of the present invention is to provide a polypropylene-based adhesive excellent in both initial adhesion and adhesion after a heat history, and to provide a laminate excellent in adhesion and heat resistance.

Means for Solving the Problems

The present inventors conducted intensive research in order to solve the above problems and completed the present invention described in the following.

Specifically, this invention is a polypropylene-based adhesive having an MFR of 2.7 g/10 min or higher as measured at 230° C. under a load of 2.16 kg, comprising a composition which comprises; 5-95 parts by weight of (A) an isotactic polypropylene; 95-5 parts by weight of (B) a propylene/ethylene random copolymer (B), which is characterized by the following (i) to (iii); an ethylene/propylene random copolymer (C), wherein 100 parts by weight of the composition is graft modified with 0.001-5 parts by weight of an unsaturated carboxylic acid and/or a derivative thereof.

(i) The propylene/ethylene random copolymer (B) contains 60-90 mol % of units derived from propylene and 10-40 mol % of units derived from ethylene.

(ii) The melting point (Tm) as measured with a differential scanning calorimeter is in the range of 40-120° C.

(iii) The molecular weight distribution (Mw/Mn) as determined by gel permeation chromatography (GPC) is in the range of 1.0-3.0.

Preferably, no ethylene/propylene random copolymer (C) is contained when the amount of the isotactic polypropylene (A) is 50 parts by weight or more and the ethylene/propylene copolymer (C) is contained in an amount of 1-40 parts by weight when the amount of the isotactic polypropylene (A) is less than parts by weight. Furthermore, the derivative of an unsaturated carboxylic acid is preferably maleic anhydride.

The laminate of the present invention has at least one layer containing the adhesive. Furthermore, the laminate of the present invention is formed by at least laminating one layer containing the adhesive and another layer containing a saponified ethylene/vinyl acetate copolymer. Adhesive strength of these laminates after heat histories are preferably 80% or more of initial adhesive strength.

Effect of the Invention

The polypropylene-based adhesive of the present invention is a composition excellent in both initial adhesion and adhesion after a heat history. The polypropylene-based adhesive of the present invention makes it possible to obtain a molded article excellent in initial adhesive strength and is, at the same time, usable for a molded article required of adhesive strength after a heat history.

BEST MODE FOR CARRYING OUT THE INVENTION

Hereinafter, the present invention will be described in further detail.

The polypropylene-based adhesive of the present invention is a polypropylene-based adhesive comprising a composition which comprises 5-95 parts by weight of (A) an isotactic polypropylene and 95-5 parts by weight of (B) a propylene/ethylene random copolymer, which is characterized by the following (i) to (iii), wherein 100 parts by weight of the composition is graft modified with 0.001-5 parts by weight of an unsaturated carboxylic acid and/or a derivative thereof.

(i) the propylene/ethylene random copolymer (B) contains 60-90 mol % of units derived from propylene and 10-40 mol % of units derived from ethylene, (ii) the melting point (Tm) as measured with a differential scanning calorimeter is in the range of 40-120° C., and (iii) the molecular weight distribution (Mw/Mn) as determined by gel permeation chromatography (GPC) is in the range of 1.0-3.0.

In the following, each component is described.

(A) Isotactic Polypropylene

The isotactic polypropylene used in the present invention/ is a propylene homopolymer and/or a propylene/α-olefin copolymer.

There is no particular restriction on α-olefins. However, preferable examples include ethylene and/or α-olefins having 4 to 20 carbon atoms. These α-olefins may be used singly or in combination of two or more kinds. In the present invention, a more preferable α-olefin is ethylene or an α-olefin having 4 to 10 carbon atoms, and most preferable is ethylene or an α-olefin having 4 to 8 carbon atoms.

Here, the propylene/α-olefin copolymer preferably contains at least 90 mol % or more of units derived from propylene.

The MFR is not particularly limited and is preferably 0.1-100 g/10 min, more preferably 0.5-50 g/10 min. It should be noted that, in the present description, the MFR was measured at 230° C. and under a load of 2.16 kg.

There is no particular restriction on the process for producing the isotactic polypropylene (A), which may be produced by publicly known processes using publicly known catalysts such as a Ziegler-Natta catalyst, a metallocene catalyst, and the like. Crystalline polymers can also be used preferably, and in the case of copolymers, either a random copolymer or a block copolymer may be used. Furthermore, there is no particular restriction on stereo-regularity or a molecular weight of the polymer, provided that the polymer possesses satisfactory moldability and that a molded article is strong enough for practical use. A commercial resin may be used as received.

The isotactic polypropylene (A) preferably used in the present invention is a homo polypropylene or a propylene/α-olefin random copolymer. Several kinds of isotactic polypropylenes may be blended for use. Furthermore, the isotactic polypropylene may be graft modified with a small amount of maleic anhydride and the like. The isotactic polypropylene may also be first graft modified with a small amount of maleic anhydride and the like, followed by further modification of the grafted monomer with diamines, carbodiimides, and the like.

(B) Propylene/ethylene Random Copolymer

The propylene/ethylene random copolymer (B) used in the present invention is characterized by the following (i)-(iii): (i) the propylene/ethylene random copolymer (B) contains 60-90 mol % of units derived from propylene and 10-40 mol % of units derived from ethylene; (ii) the melting point (Tm) as measured with a differential scanning calorimeter is in the range of 40-120° C.; and (iii) the molecular weight distribution (Mw/Mn) as determined by gel permeation chromatography (GPC) is in the range of 1.0-3.0. As regards (i), a preferable range is 65-90 mol % of propylene and 10-35 mol % of ethylene; a more preferable range is 70-90 mol % of propylene and 10-30 mol % of ethylene. As regards (ii), the melting point (Tm) is preferably in the range of 40-110° C., more preferably in the range of 40-100° C. As regards (iii), Mw/Mn is preferably in the range of 1.0-2.8, more preferably in the range of 1.0-2.5.

The MFR is not particularly limited and is preferably 0.1-100 g/10 min, more preferably 0.5-50 g/10 min.

There is no particular restriction on the process for producing the propylene/ethylene random copolymer (B), which may be produced by publicly known processes using publicly known catalysts such as a Ziegler-Natta catalyst, a metallocene catalyst, and the like. Furthermore, there is no particular restriction on stereo-regularity or a molecular weight of the polymer, provided that the polymer has satisfactory moldability and that a molded article is strong enough for practical use. A commercial resin may also be used as received. In the present invention, the copolymer may be graft modified with a small amount of maleic anhydride or the like, provided that the requirements described above are satisfied. Furthermore, provided that the above requirements are satisfied, the copolymer may be first graft modified with a small amount of maleic anhydride and the like, followed by further modification of the grafted monomer with diamines, carbodiimides, and the like.

(C) Ethylene/propylene Random Copolymer

The ethylene/propylene random copolymer (C) in the present invention contains 60-90 mol % of units derived from ethylene and 10-40 mol % of units derived from propylene. A preferable range is 65-90 mol % of ethylene and 10-35 mol % of propylene, and a more preferable range is 70-90 mol % of ethylene and 10-30 mol % of propylene. The MFR is preferably in the range of 0.1-100 g/10 min, and more preferably in the range of 0.5-50 g/10 min. Mw/Mn is preferably in the range of 1.0-5.0, and more preferably in the range of 1.0-3.0.

There is no particular restriction on the process for producing the ethylene/propylene random copolymer (C), which may be produced by publicly known processes using publicly known catalysts such as a Ziegler-Natta catalyst, a metallocene catalyst, and the like. Furthermore, there is no particular restriction on stereo-regularity or a molecular weight of the copolymer, provided that the copolymer has satisfactory moldability and that a molded article is strong enough for practical use. A commercial resin may be used as received. In the present invention, provided that the requirements described above are satisfied, (C) may be graft modified with a small amount of maleic anhydride or the like. Furthermore, provided that the above requirements are satisfied, (C) may be first graft modified with a small amount of maleic anhydride and the like, followed by further modification of the grafted monomer with diamines, carbodiimides, and the like.

Polypropylene-based Adhesive

The polypropylene-based adhesive of the present invention is composed of a composition containing 5-95 parts by weight of an isotactic polypropylene (A), 95-5 parts by weight of the above-mentioned propylene/ethylene random copolymer (B), and 0-40 parts by weight of an ethylene/propylene random copolymer (C), wherein 100 parts by weight of the composition is graft modified with 0.001-5 parts by weight of an unsaturated carboxylic acid and/or a derivative thereof. In the present invention, by having the above specific composition of the components (A), (B), and (C), an adhesive excellent in both initial adhesion and adhesion after a heat history is obtained.

The present invention preferably contains no ethylene/propylene random copolymer (C) when the amount of isotactic polypropylene (A) is 50 parts by weight or more. When the amount of isotactic polypropylene (A) is less than 50 parts by weight, the ethylene/propylene copolymer (C) is preferably contained in an amount of 1 to 40 parts by weight. Especially when the amount of component (A) is less than 50 parts by weight, the adhesive containing components (A), (B), and (C) is useful for practical applications because the adhesive exhibits excellent adhesion properties not only after a heat history but also after rapid molding and after drawing.

The MFR of polypropylene-based adhesive of the present invention is 2.7 g/10 min or higher, preferably 2.8-50 g/10 min, and more preferably 3.0-30 g/10 min.

In another embodiment of the present invention, the polypropylene-based adhesive of the present invention may contain a composition, at least a portion of which is graft modified. As a graft monomer, an unsaturated carboxylic acid and/or a derivative thereof may preferably be used. As the unsaturated carboxylic acid and/or a derivative thereof, there may be mentioned an unsaturated compound containing one or more carboxylic groups, a carboxyl group-containing ester of an unsaturated carboxylic acid with an alkyl alcohol, an unsaturated compound containing one or more carboxylic anhydride group (for example, an anhydride of an unsaturated dicarboxylic acid), and the like. As the unsaturated group, there may be mentioned vinyl, vinylene, unsaturated cyclic hydrocarbon groups, and the like. Upon using an unsaturated carboxylic acid and/or a derivative thereof in the present invention, it or they may also be used singly or in a combination of two or more kinds. Among these, an unsaturated dicarboxylic acid or an anhydride thereof is suitable, and particularly a maleic acid, a nadic acid, or an anhydride of these acids may be used preferably.

The content of graft monomer is usually 0.001-5 parts by weight, and preferably 0.01-3 parts by weight based on 100 parts by weight of the composition. When the amount of the graft monomer is kept in the above range, the adhesive of the present invention exhibits high adhesion strength to a resin composing a laminate described later. The content of a graft monomer is easily controlled, for example, by choosing the grafting condition appropriately.

<Method of Grafting>

In the present invention, there is no particular restriction on a method of grafting a graft monomer which is selected from a unsaturated carboxylic acid and/or a derivative thereof, and publicly known graft polymerization methods such as a solution method, a melt kneading method, and the like may be employed. For example, there is a method where a polymer is melted and a monomer is added to this and graft reacted, a method where a polymer is dissolved in a solvent and a graft monomer is added to this solution and graft reacted or the like.

<Method for Producing an Adhesive>

There is no particular restriction on the method for producing the propylene-based adhesive of the present invention, and any publicly known method may be employed. For example, there may be mentioned a method where an isotactic polypropylene (A), a propylene/ethylene random copolymer (B), an ethylene/propylene random copolymer (C), and, further, other components which are added as necessary, are melt kneaded all at once or each successively. When graft modification is carried out, there is a method of grafting in the presence of all of the components (A), (B), and (C), or there is a method where a portion of component (A), (B), or (C) is graft modified and then the obtained graft modified polymer and non-modified polymer are melt kneaded to obtain a modified polyolefin composition.

In the present invention, preferable is a method in which a portion or all of the isotactic polypropylene (A) is first graft modified and then the unmodified components are melt kneaded. As a method of melt kneading, for example, there may be mentioned a method where the resin composition is first dry blended and then melt kneaded by a single or twin-screw extruder, a banbury mixer, rolls, various kneaders, or the like. Industrially, extruders are suitably used. There is no particular restriction on the temperature of melt kneading, provided that (A), (B), and (C) components are melted, but melt kneading is generally carried out in the temperature range of 160-300° C., preferably 180-250° C.

To the polypropylene-based adhesive of the present invention, there may be added other compatible resins, elastomers, and the like within the object of the present invention. Other resins and the like may be added concurrently with the above-mentioned (A), (B), and (C), or after the production of a polypropylene-based adhesive from (A), (B), and (C).

To the polypropylene-based adhesive of the present invention, there may be added publicly known additives such as a process stabilizer, a heat stabilizer, an anti-heat aging agent, a filler, and the like within the object of the present invention. In the present invention, it is particularly preferable to blend what is called a tackifier in order to impart tackiness. As materials which impart tackiness, there may be mentioned, for example, a rosin derivative, a terpene resin, a petroleum resin, and a hydrogenated product thereof. Among these, a hydrogenated terpene resin and a hydrogenated petroleum resin are preferable. The tackifier is preferably added in the proportion of 5-30 wt % relative to 70-95 wt % of the polypropylene-based adhesive.

<Laminate>

The resin composition for the polypropylene-based adhesive of the present invention may suitably be used as an adhesive layer of a laminate. As other resins of a thermoplastic resin layer composing a laminate, various thermoplastic resins, for example, a polyolefin, a polyester, a polyamide, or an ethylene/vinyl alcohol copolymer may be used. Among these, an ethylene/vinyl alcohol copolymer is preferably used. A metal or an inorganic material may also be used to compose the laminate.

As an ethylene/vinyl alcohol copolymer, preferred is a copolymer containing 20-50 mol %, more preferably 25-48 mol % of polymer units derived from ethylene. These may be produced by saponifying the corresponding ethylene/vinyl acetate copolymer by a conventional method.

The laminate of the present invention is preferably obtained by laminating an ethylene/vinyl alcohol copolymer layer, or a saponified ethylene/vinyl acetate copolymer layer on at least one side of the layer containing the resin composition for the polypropylene-based adhesive of the present invention. The shape of the laminate is not particularly limited and may be any of a sheet, membrane, pipe and the like.

The laminate of the present invention may be fabricated, for example, by melting the composition and resin of each layer respectively and laminating the composition and resin in a melted state. The laminate may also be fabricated by coating the adhesive in a melted state on the surface of a film or a metal pipe.

The laminate of the present invention uses a specific adhesive, and the layer composed of such an adhesive exhibits excellent initial adhesion to adherends, for example, an ethylene/vinyl alcohol copolymer, and also, even after imparted a heat history, an adhesive strength corresponding to 80% or more of the initial adhesion is maintained. Therefore, the laminate of the present invention has good heat resistance and, even after drawn, the resin layer or metal layer composing the laminate does not easily peel off.

It should be noted that, in the present invention, adhesive strength of the laminate of the present invention is evaluated according to the following.

[Initial Adhesive Strength]

Adhesive strength evaluated by a method described in EXAMPLES after the fabricated laminate is kept at an ordinary temperature for a week.

[Adhesive Strength after a Heat History]

Adhesive strength evaluated by a method described in EXAMPLES after the fabricated laminate is kept at an ordinary temperature for a week, and then in atmosphere at 90° C. for 3 days.

EXAMPLES

Hereinafter, the present invention will be further described referring to examples and comparative examples. However, the present invention is not limited by these examples in any way unless they depart from the scope of the invention.

(Methods of Various Measurements)

In the present EXAMPLES and the like, measurements were made according to the following methods.

[Melt Flow Rate (MFR)]

Measurements were made according to ASTM D1238, at 230° C. and under a load of 2.16 kg.

[Interlaminar Adhesive Strength of Films]

Of the three-laminate composed of polypropylene/adhesive resin/EVOH, interlaminar adhesive strength between the EVOH layer and adhesive layer was evaluated by a T-peel test. Evaluation was made in atmosphere at 23° C. using a tensile tester with initial samples and those stored at 90° C.×3 days. The crosshead speed was set at 300 mm/min.

[Density]

Density was measured according to JIS K7112.

[Melting Point (Tm)]

An endothermic DSC curve was obtained and the temperature corresponding to a peak maximum below 140° C. was read as Tm. As for the measurement, the sample was filled in an aluminum pan, heated to 200° C. at a rate of 100° C./min, maintained at 200° C. for 5 minutes and cooled to −20° C. at a rate of 20° C./min. Then, the reading was made with an endothermic curve obtained by heating this sample at a rate of 20° C./min.

[Weight Average Molecular Weight (Mw) and Molecular Weight Distribution (Mw/Mn)]

Weight average molecular weight (Mw) and molecular weight distribution (Mw/Mn) were measured using Alliance GPC-2000 as follows.

The separation column used was TSKgel GMH6-HT×2+ TSKgel GMH6-HTL×2, and the column size was 7.5 mm in diameter and 300 mm in length, with the column temperature set at 140° C. Orthodichlorobenzene (produced by Wako Pure Chemical Industries, Ltd.) was employed as a mobile phase with 0.025 wt % of BHT (butylhydroxytoluene, produced by Takeda Pharmaceutical Co., Ltd.) added as an antioxidant and was pumped at a rate of 1.0 ml/min. The sample concentration was 0.1 wt % and the injection volume was set at 500 μL. As a detector, a differential refractometer was employed. The polystyrene standards used were products of Tosoh Corp.

(Polyolefins Used)

Polyolefins used in EXAMPLES and Comparative Examples are shown below. Unless otherwise noted, they were prepared by polymerization according to conventional methods.

Modified PP-1: modified isotactic homo polypropylene
(Melt flow rate, 5.0 g/10 min; density, 0.90 g/cm$^3$; grafted amount of maleic anhydride=0.5 wt %)

Modified PP-2: modified isotactic homo polypropylene
(Melt flow rate, 50 g/10 min; density, 0.90 g/cm$^3$; grafted amount of maleic anhydride=1.0 wt %)

PP-1: random polypropylene
(Propylene/ethylene/butene=96 mol %/3 mol %/1 mol %; melt flow rate, 7.0 g/10 min; density, 0.90 g/cm$^3$)

PER-1: propylene/ethylene random copolymer
(Melt flow rate, 2.0 g/10 min; density, 0.89 g/cm$^3$; ethylene=20 mol %; mp=72° C.; Mw/Mn=1.9)

PER-2: propylene/ethylene copolymer
(Melt flow rate, 2.0 g/10 min; density, 0.89 g/cm$^3$; ethylene=15 mol %; mp=125° C.; Mw/Mn=3.0)

PER-3: propylene/ethylene copolymer
(Melt flow rate, 2.0 g/10 min; density, 0.89 g/cm$^3$; ethylene=20 mol %; mp=110° C.; Mw/Mn=4.0)

EPR-1: ethylene/propylene copolymer
(Melt flow rate, 0.7 g/10 min; density, 0.87 g/cm$^3$; propylene=19 mol %)

Example 1

Production of Adhesives
<Production of a Propylene-based Adhesive>

A propylene-based adhesive was obtained by melt kneading 80 wt % of a modified isotactic homo polypropylene (PP-1) with a melt flow rate of 5.0 g/10 min and density of 0.90 g/cm$^3$ (A) and 20 wt % of a propylene/ethylene random copolymer (PER-1) with a melt flow rate of 2.0 g/10 min and density of 0.89 g/cm$^3$ (B) using a uniaxial extruder at 230° C. The obtained propylene-based adhesive had a melt flow rate of 4.0 g/10 min and a density of 0.89 g/cm$^3$.

<Production of a Three-laminate>

A three-laminate was fabricated by co-extruding each layer of the following composition under conditions described below.

[Inner Layer]

As an ethylene/vinyl alcohol copolymer (hereinafter referred to as EVOH), EVAL (a registered trademark; produced by Kuraray Co., Ltd.) F101A (MFR=1.0 g/10 min) was extruded at 220° C. using a screw of 40 mm in diameter and L/D=28.

[Outer Layer and Interlayer]

A commercial polypropylene (F327D produced by Prime Polymer Co., Ltd.; MFR=7) as an outer layer and the propylene-based adhesive of the present invention as an interlayer were extruded at 230° C. using a screw of 50 mm in diameter and the effective length, L/D=28.

[Conditions for Fabricating Laminates]

Resins extruded as the outer layer, inner layer, and interlayer are laminated in the feed block in the order of inner layer, interlayer, and outer layer. The die temperature is 230° C. The laminate of each resin co-extruded as a film of about 240 μm in thickness is taken up at a speed of 5 m/min while being chilled with a chill roll. The thickness of each layer was set at outer layer (polypropylene)/interlayer (adhesive)/inner layer (EVOH)=160/40/40 μm.

Interlaminar adhesive strength of the fabricated laminate is shown in Table 1.

<Evaluation of Adhesive Strength of the Laminate>

The laminate fabricated above was cut in 15 mm width and adhesion strength (unit: N/15 mm) between the interface of EVOH layer and adhesive layer was measured by a T-peel test at a room temperature of 23° C. using a tensile tester. The measurements were made at an initial stage and after a heat history of 90° C.×3 days. The crosshead speed was set at 300 mm/min.

TABLE 1

| Compounding recipe | EXAMPLE 1 | EXAMPLE 2 | EXAMPLE 3 | Comparative Example 1 | Comparative Example 2 | Comparative Example 3 | Comparative Example 4 |
|---|---|---|---|---|---|---|---|
| Modified PP-1 | 80 | 60 | | 40 | 80 | 80 | |
| Modified PP-2 | | | 15 | | | | 15 |
| PP-1 | | | | | | | 60 |
| PER-1 | 20 | 40 | 60 | 60 | | | |
| PER-2 | | | | | 20 | | |
| PER-3 | | | | | | 20 | |
| EPR-1 | | | 25 | | | | 25 |
| Total amount (parts) | 100 | 100 | 100 | 100 | 100 | 100 | 100 |
| MFR of composition [g/10 min] | 4.0 | 3.0 | 10 | 2.5 | 4.0 | 4.0 | 5.8 |
| Initial peel strength [N/15 mm] | 12 | 12 | Resin rupture | 4 | 10 | 10 | |
| Peel strength after a heat history [N/15 mm] | 12 | 12 | Resin rupture | 4 | 6 | 4 | |

(Resin rupture: The results of a sample which showed such strong adhesion such that the film was ruptured during measurement with a tensile tester, is expressed as "resin rupture".)

Examples 2-3

Comparative Examples 1-4

Adhesives were prepared according to the recipes shown in Table 1, in a similar manner to that of EXAMPLE 1.

The physical properties of the obtained adhesives, and results of measurements and evaluation of the laminates fabricated are shown in Table 1.

Reference Example

Using the adhesives in EXAMPLE 3 and Comparative Example 4 and under the aforementioned conditions for laminate fabrication, two kinds of laminates were prepared by changing the take-up speed, one at a speed of 20 m/min with thickness of each layer being 40/10/20 µm and another at a speed of 40 m/min with thickness of each layer being 20/5/10 µm. Initial peel strength of these two kinds was measured. Initial peel strength was also measured for the laminates fabricated under the aforementioned conditions and drawn by a concurrent biaxial orientation machine. Drawing was carried out at 80° C. and at a speed of 1.5 m/min, concurrently in vertical and transverse directions, with two draw ratios: 2 vertically and transversely, and 3 vertically and transversely.

The results are shown in Table 2.

TABLE 2

| Adhesive strength under different molding conditions | EXAMPLE 3 | Comparative Example 4 |
| --- | --- | --- |
| Product taken up at 5 m/min | Resin rupture | 21 |
| Product taken up at 20 m/min | 8.6 | 3.5 |
| Product taken up at 40 m/min | 5.0 | 1.6 |
| Biaxially oriented product (Draw ratio = 2, vertically and transversely) | Impossible to peel | 2.2 |
| Biaxially oriented product (Draw ratio = 3, vertically and transversely) | Resin rupture | 0.3 |

The invention claimed is:

1. A polypropylene-based adhesive having an MFR of 2.7 g/10 min or higher as measured at 230° C. under a load of 2.16 kg, consisting essentially of a composition which comprises 5-95 parts by weight of (A) an isotactic polypropylene, 95-5 parts by weight of (B) a propylene/ethylene random copolymer, and 0-40 parts by weight of (C) an ethylene/propylene random copolymer (where the sum of the contents of the isotactic polypropylene (A), propylene/ethylene random copolymer (B), and ethylene/propylene random copolymer (C) is 100 parts by weight), wherein 100 parts by weight of the composition is graft modified with 0.001-5 parts by weight of an unsaturated carboxylic acid and/or a derivative thereof, and wherein (B) is characterized by the following (i) to (iii):
   (i) the propylene/ethylene random copolymer (B) contains 60-90 mol % units derived from propylene and 10-40 mol % units derived from ethylene,
   (ii) the melting point (Tm) as measured with a differential scanning calorimeter is in the range of 40-120° C., and
   (iii) the molecular weight distribution (Mw/Mn) as determined by gel permeation chromatography (GPC) is in the range of 1.0-3.0,
   wherein the ethylene/propylene random copolymer (C) is absent when the amount of isotactic polypropylene (A) is 50 parts by weight or more, or the ethylene/propylene random copolymer (C) is present in an amount of 1-40 parts by weight when the amount of isotactic polypropylene (A) is less than 50 parts by weight,
   wherein the ethylene/propylene random copolymer (C) contains 60-90 mol % of units derived from ethylene and 10-40 mol % of units derived from propylene.

2. The adhesive according to claim 1, wherein the derivative of an unsaturated carboxylic acid is maleic anhydride.

3. A laminate comprising at least one layer containing the adhesive according to claim 1.

4. A laminate comprising at least laminating a layer containing the adhesive according to claim 1 and another layer containing an ethylene/polyvinyl alcohol or saponified ethylene/vinyl acetate copolymer.

5. A laminate, wherein the adhesive strength between a layer composed of adhesive according to the claim 1 and a layer composed of ethylene/polyvinyl alcohol after a heat history at 90° C. for 3 days is 80% or more of initial adhesive strength.

6. A laminate comprising at least one layer containing the adhesive according to claim 2.

* * * * *